United States Patent [19]

Millar

[11] Patent Number: 4,581,707
[45] Date of Patent: Apr. 8, 1986

[54] MICROPROCESSOR CONTROLLED VALVE FLOW INDICATORS

[75] Inventor: John Millar, Hoylake, United Kingdom

[73] Assignee: John Millar (U.K.) Limited, Hoylake, United Kingdom

[21] Appl. No.: 346,068

[22] PCT Filed: May 22, 1981

[86] PCT No.: PCT/GB81/00092
§ 371 Date: Jan. 22, 1982
§ 102(e) Date: Jan. 22, 1982

[87] PCT Pub. No.: WO81/03542
PCT Pub. Date: Dec. 10, 1981

[30] Foreign Application Priority Data
May 30, 1980 [GB] United Kingdom ............. 8017809

[51] Int. Cl.⁴ ................................. G01F 1/00
[52] U.S. Cl. .............................. 364/509; 364/510; 73/861
[58] Field of Search ............. 364/509, 510; 137/551; 251/129; 73/168, 198, 861

[56] References Cited

U.S. PATENT DOCUMENTS

| Re. 29,383 | 9/1977 | Gallatin et al. | 364/510 X |
|---|---|---|---|
| 3,701,280 | 10/1972 | Stroman | 364/510 X |
| 3,729,995 | 5/1973 | Kovacs et al. | 364/510 X |
| 3,871,214 | 3/1975 | Masaki et al. | 73/116 |
| 3,875,955 | 4/1975 | Gallatin et al. | 137/14 |
| 3,888,458 | 6/1975 | Bubniak et al. | 251/118 |
| 4,108,574 | 8/1978 | Bartley et al. | 417/19 |
| 4,149,254 | 4/1979 | Molusis | 364/510 |

FOREIGN PATENT DOCUMENTS 1476831 6/1977 United Kingdom.
2026704 2/1980 United Kingdom.

Primary Examiner—Errol A. Krass
Assistant Examiner—Edward R. Cosimano
Attorney, Agent, or Firm—Gottlieb, Rackman & Reisman

[57] ABSTRACT

A device for ascertaining flow rate through one or more valves and/or pumps simultaneously. A transducer (T.10) is connected to the valve actuator member and displaceable or rotatable therewith and produces an output determined by the valve position. The output of the transducer is supplied to an electronic processing mean (13) programmed to calculate the flow rate from data relating to the flow characteristics of the or each valve and data relating to the flow characteristics of the fluid concerned and the temperature and pressure and to display the calculated flow rate or utilize the calculated flow rate to control the valve position to regulate the flow rate.

12 Claims, 9 Drawing Figures

MICROPROCESSOR CONTROLLED VALVE FLOW INDICATORS

TECHNICAL FIELD

The present invention relates to a device for ascertaining the flow rate through at least one valve, which is capable of continuously monitoring and controlling the flow rate through several valves simultaneously.

BACKGROUND OF THE INVENTION

At present, a range of mechanical, magnetic and electronic switches may be provided on or attachable to valves to provide an indication as to when a valve is fully open or fully closed, however, it has not been possible to accurately indicate intermediate positions of the valve stroke in a simple and economical way.

For instance, different types of valve have different flow characteristic curves relating percentage flow through the valve against percentage opening of the valve, so that even if the percentage opening of several different types of valve was the same, then widely differing flow rates result and thus make it extremely difficult for simple mechanical, magnetic and electronic devices, which measure the actual opening of the valve, to give a precise indication of the flow rate through the valve.

Further, for a given pressure and valve opening, changes in the temperature and viscosity of the fluid alter the flow performance which is difficult to compensate for with simple arrangements, and with very viscous fluids, if the temperature drops below a certain critical point, then viscosity may increase to an extent at which flow will cease altogether.

The aim of the present invention it to provide a device capable of ascertaining flow rate through at least one valve simultaneously and displaying said flow rate or utilising said flow rate to control said at least one valve.

DISCLOSURE OF THE INVENTION

According to the present invention a device for ascertaining flow rate through at least one valve comprises a transducer connectable to said at least one valve to be monitored, for providing a first signal representative of the position of the valve member of said at least one valve, electronic processing means receiving said first signal and having means enabling input of the information and/or further signals representing factors influencing the flow rate, said electronic processing means being capable of calculating flow rate through said at least one valve from said first signal and said input information and/or said further signals, the output of said electronic processing means being connected to a display means for displaying said calculated flow rate and/or to control means for adjusting said at least one valve to regulate the flow rate.

Preferably, the electronic processing means comprises a microprocessor programmed to calculate the flow rate through said at least one valve from equations representing the characteristic curve of said at least one valve which are stored in read-only memory (ROM) associated with the microprocessor. The various factors influencing the flow rate include the pressure drop across said at least one valve and the temperature of the fluid and these may be input to the microprocessor either via a keyboard or diectly from respective pressure and temperature sensing devices. A further factor influencing the flow rate is the viscosity of the fluid and information regarding the viscosity is input to the microprocessor via the keyboard as an initial condition when setting up. The input information can be displayed on the display means for an operator to check its accuracy prior to input of the information to the microprocessor to minimise the possibility of errors and additionally, with direct input of information relating to temperature and pressure, information regarding these values can be supplied by the microprocessor to the display to enable an operator to check that the temperature and pressure are at the required levels.

Since viscosity of the fluid varies with temperature, data regarding this variation for each type of fluid to be monitored is also stored in read-only memory associated with the microprocessor to enable the microprocessor to compensate for changes in viscosity due to variations in temperature.

The output of the microprocessor may additionally or alternatively be connected to means for controlling the position of the valve member of said at least one valve being monitored to enable the flow rate to be regulated or maintained, within prescribed tolerance levels from a desired value, independently of changes in pressure or temperature and/or to annunciate an alarm, if operational conditions cannot be maintained within prescribed tolerance levels.

BRIEF DESCRIPTION OF THE DRAWINGS

The present invention will now be described further, by way of example, with reference to the accompanying drawings, in which.

DETAILED DESCRIPTION

Figure 1A:
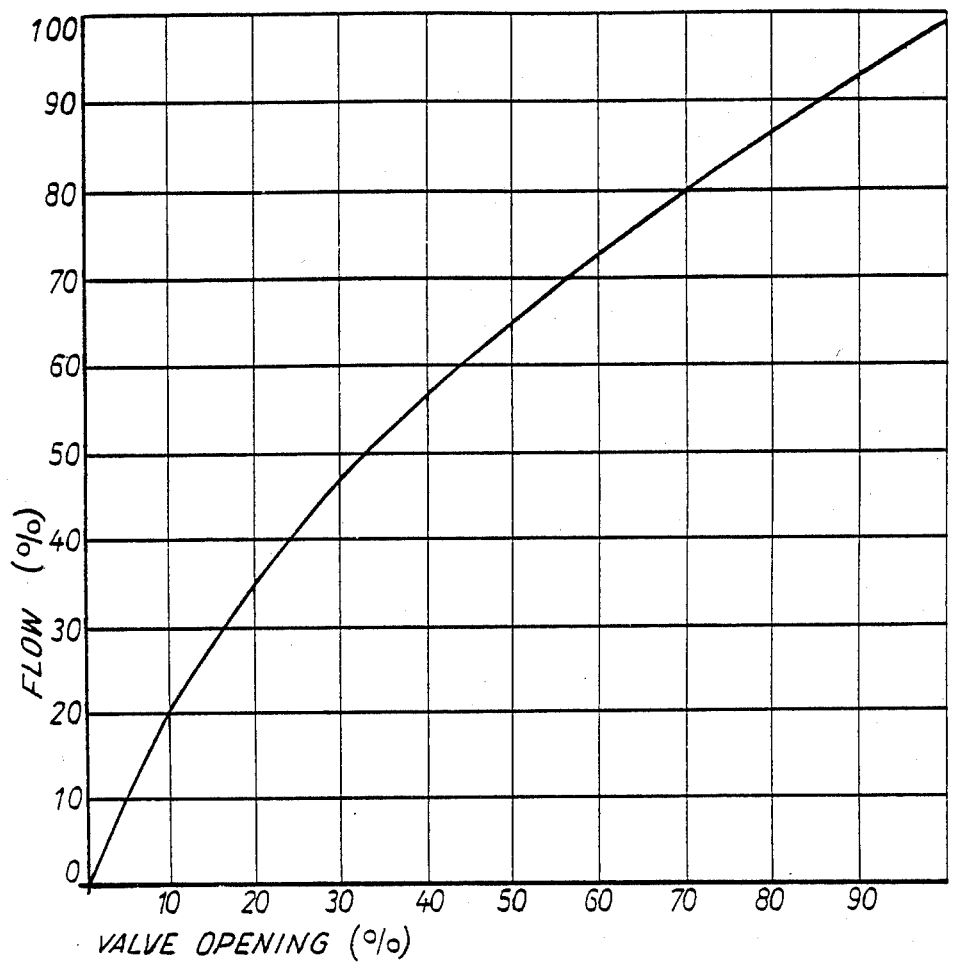
FIGS. 1a, 1b, 1c and 1d illustrate typical flow characteristics of four different types of valve.
Figure 1B:
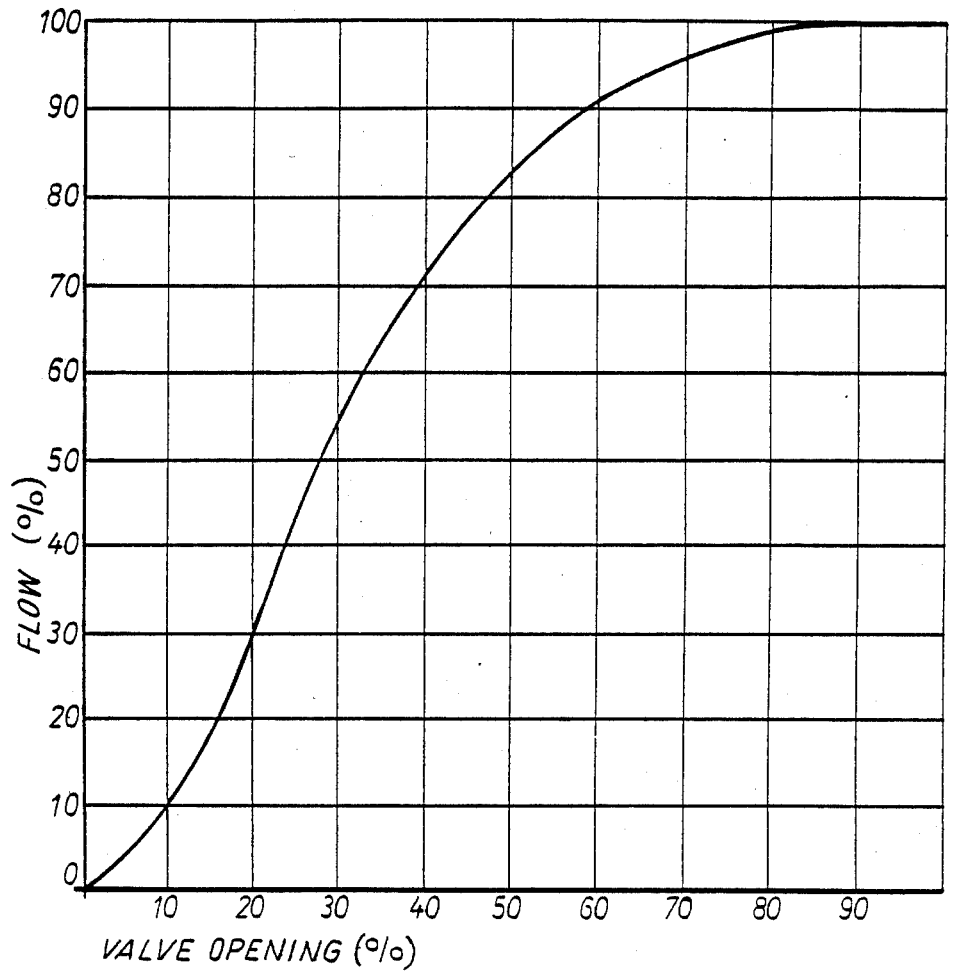
Figure 1C:
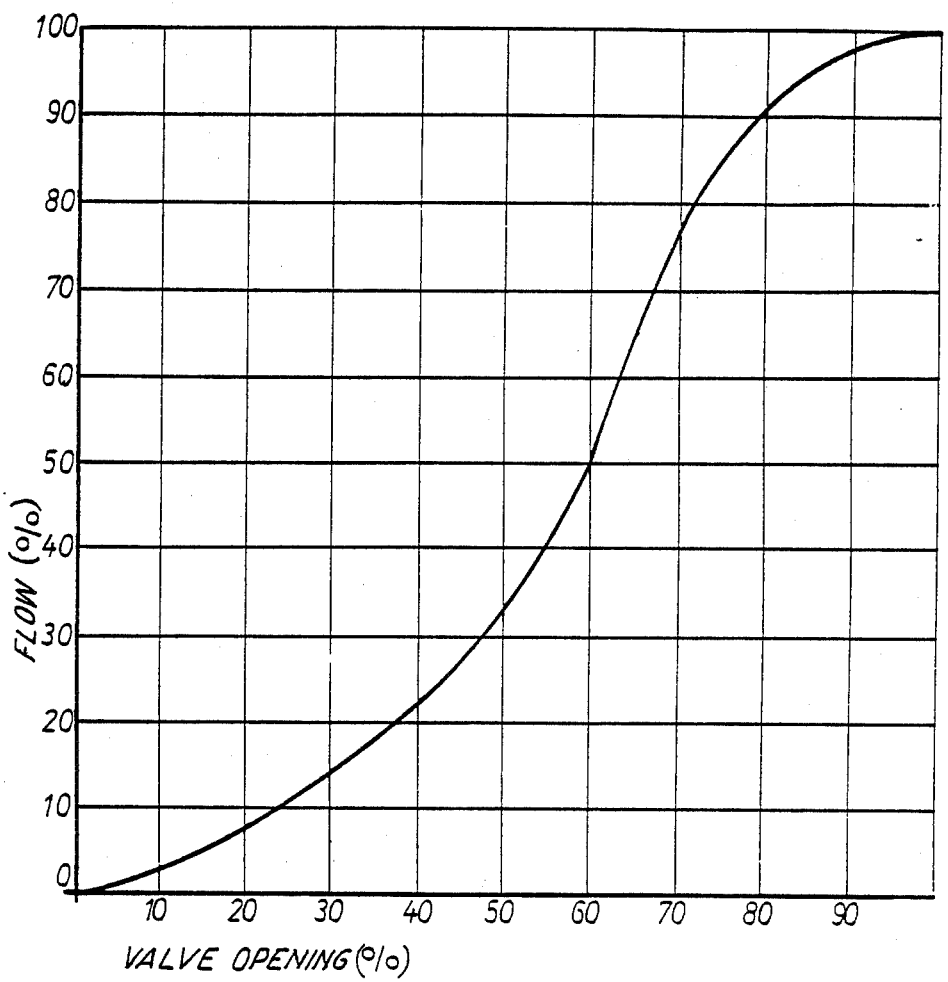
Figure 1D:
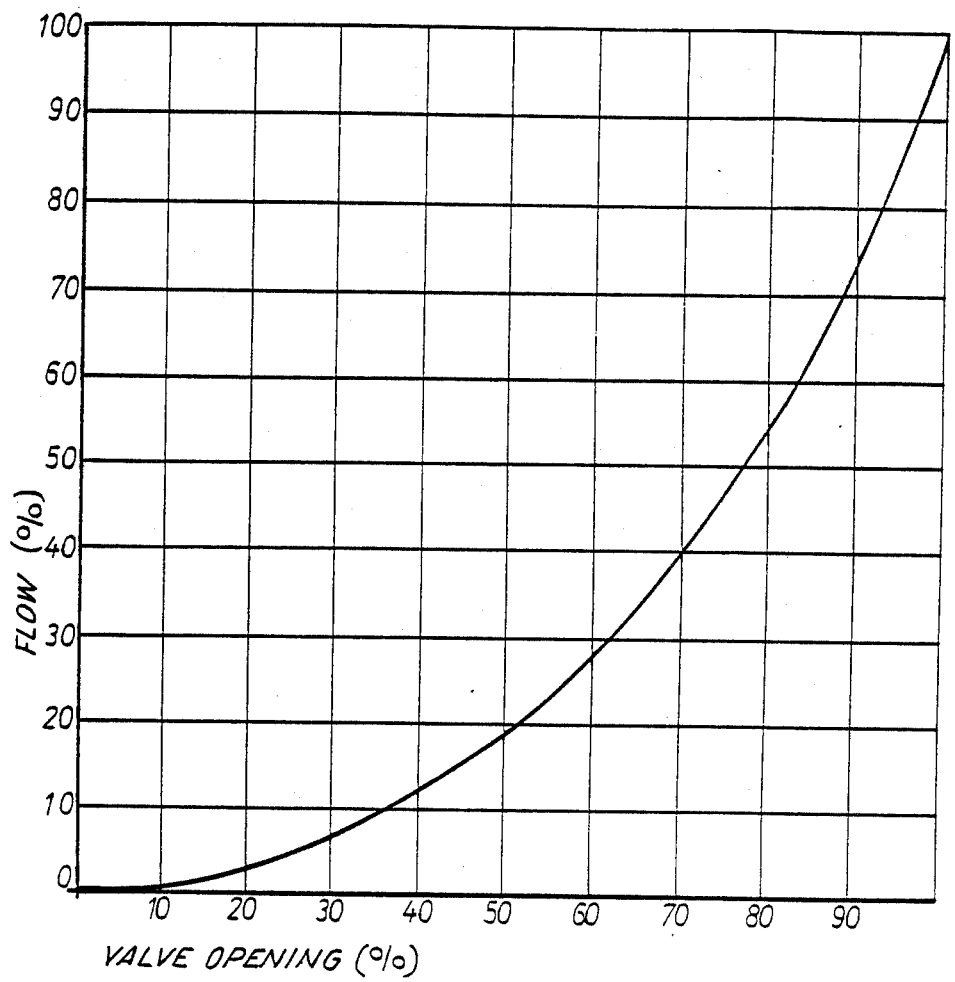

Referring to the graphs shown in FIGS. 1a, 1b, 1c and 1d, typical flow characteristic curves are shown for four different types of valves which clearly illustrate the variation between the flow characteristics of different valves and other types of valves can be treated in a similar way. The characteristic illustrated in FIG. 1a is for a Saunders Type "A" (Weir type) diaphragm valve and it can be seen that, for a 50% opening of the valve, the percentage flow through the valve would be of the order of approximately 65% whereas for a different type of diaphragm valve, namely a Saunders Type "KB" (straight through) diaphragm valve as illustrated in FIG. 1b, a similar percentage opening would give a percentage flow through the valve of the order of 85%. For other types of valve, such as a ball valve, the characteristic of which is illustrated in FIG. 1c, and butterfly valve, a typical characteristic for which is illustrated in FIG. 1d, a percentage opening of 50% would provide a 19% flow in the case of the butterfly valve and a 35% flow in the case of a ball valve. Consequently, the difficulties involved in providing a direct readout of the flow rate through a valve determined from the degree of opening of the valve can be clearly seen, in that it is a difficult matter to accommodate for such widely varying flow characteristics of different types of valves.

In consequence, different techniques have so far only sought to indicate whether the valve was open or closed and the flow rate through the valve was hitherto determined using flowmeters.

Figure 2:
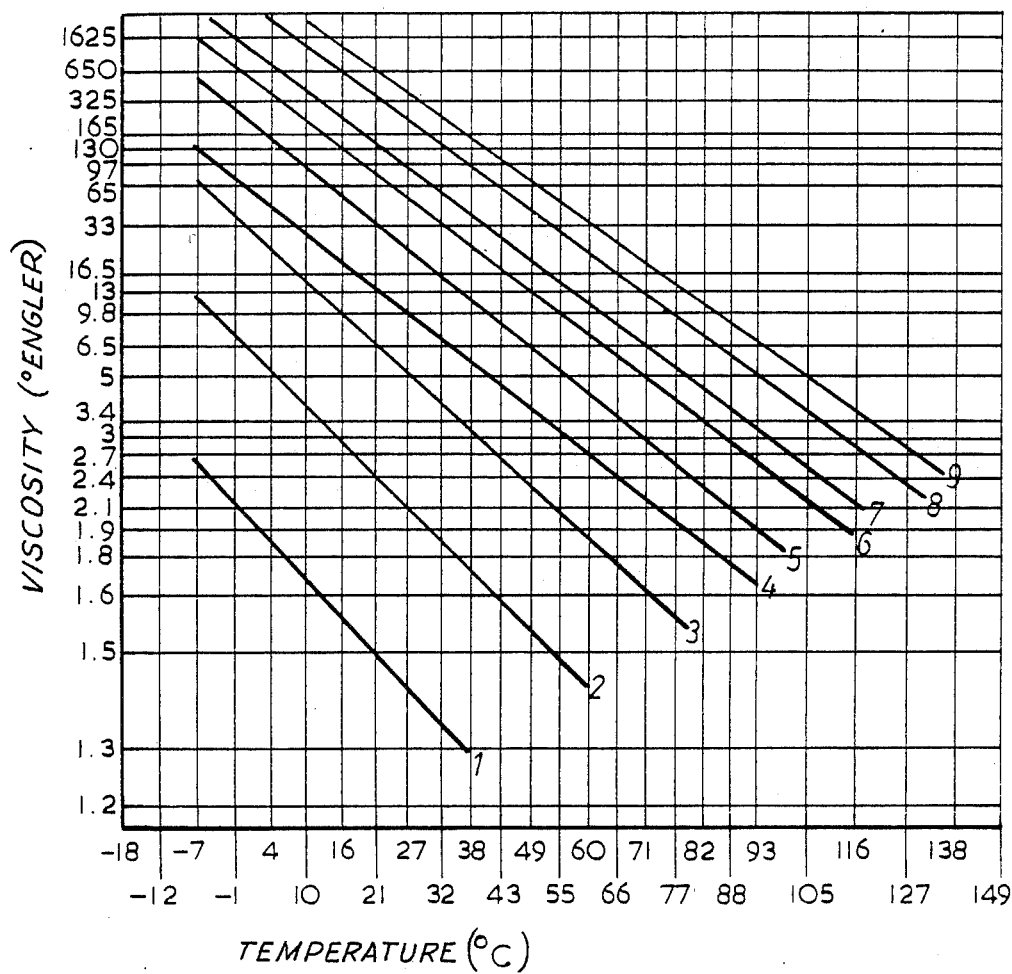
FIG. 2 is a series of graphs illustrating variations in viscosity of various fluids with respect to temperature.

Apart from variations in flow characteristics for different valve constructions, the flow rate through a valve is determined by the viscosity of the fluid flowing through the valve and since viscosity varies with temperature, then the temperature of the fluid also has an effect on the flow rate, which introduces an additional variable which is again difficult to compensate for when attempting to provide an accurate indication of the flow rate through a valve. Typical viscosity/temperature curves are illustrated in FIG. 2 for nine different types of fluid of varying viscosity as listed in the Table below:

| TYPICAL VISCOSITY TEMP CURVES | | |
|---|---|---|
| CURVE | FLUID | S.G. |
| 1 | GAS OIL | 0.85 |
| 2 | HEAVY DIESEL FUEL | 0.88 |
| 3 | 100 SEC FUEL OIL | |
| 4 | BRITOLUM | 0.93 |
| 5 | 400 SEC FUEL OIL | 0.95 |
| 6 | 900 SEC FUEL OIL | 0.95 |
| 7 | 1400 SEC FUEL OIL | 0.95 |
| 8 | 3500 SEC FUEL OIL | 0.975 |
| 9 | BUNKER "C" | 0.99 |

Figure 3:
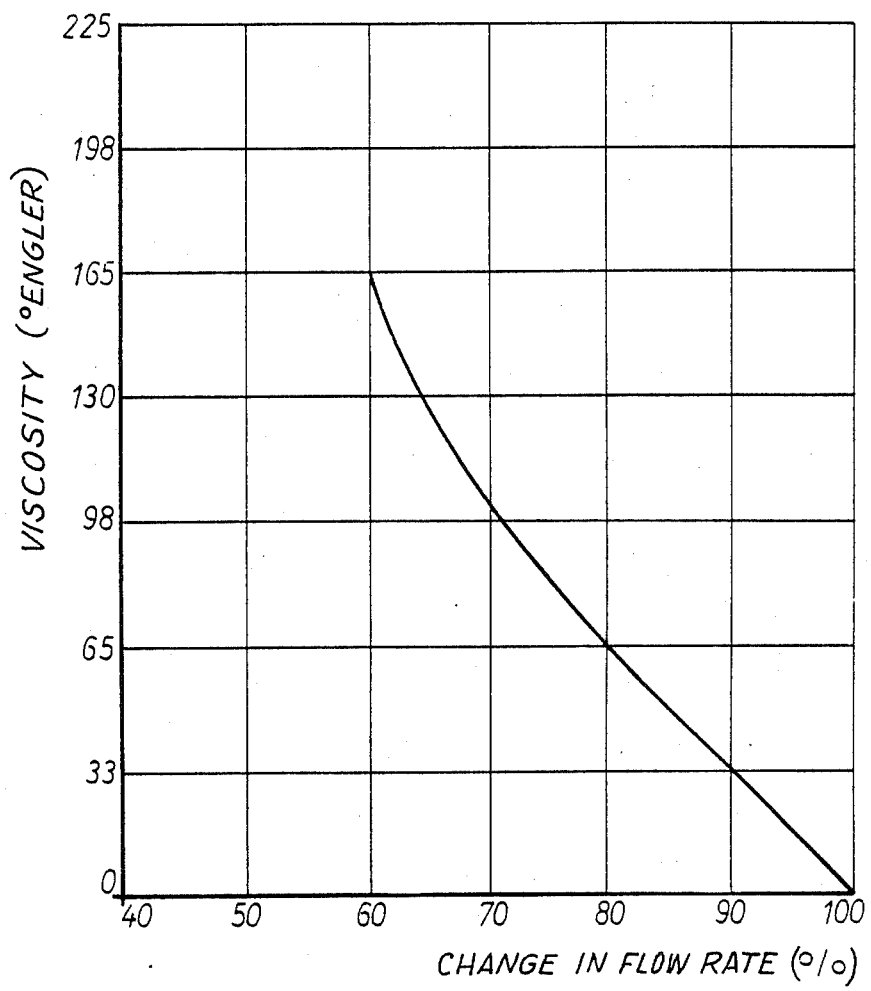
FIG. 3 is a graph illustrating the relationship between the viscosity and percentage change in flow rate at a constant pressure drop.

A further graph, illustrated in FIG. 3, illustrates the relationship between viscosity and percentage change in flow rate at constant pressure drop which can be assumed to be valid for all valve types, and which illustrates the direct viscosity has on flow rate.

Figure 4:
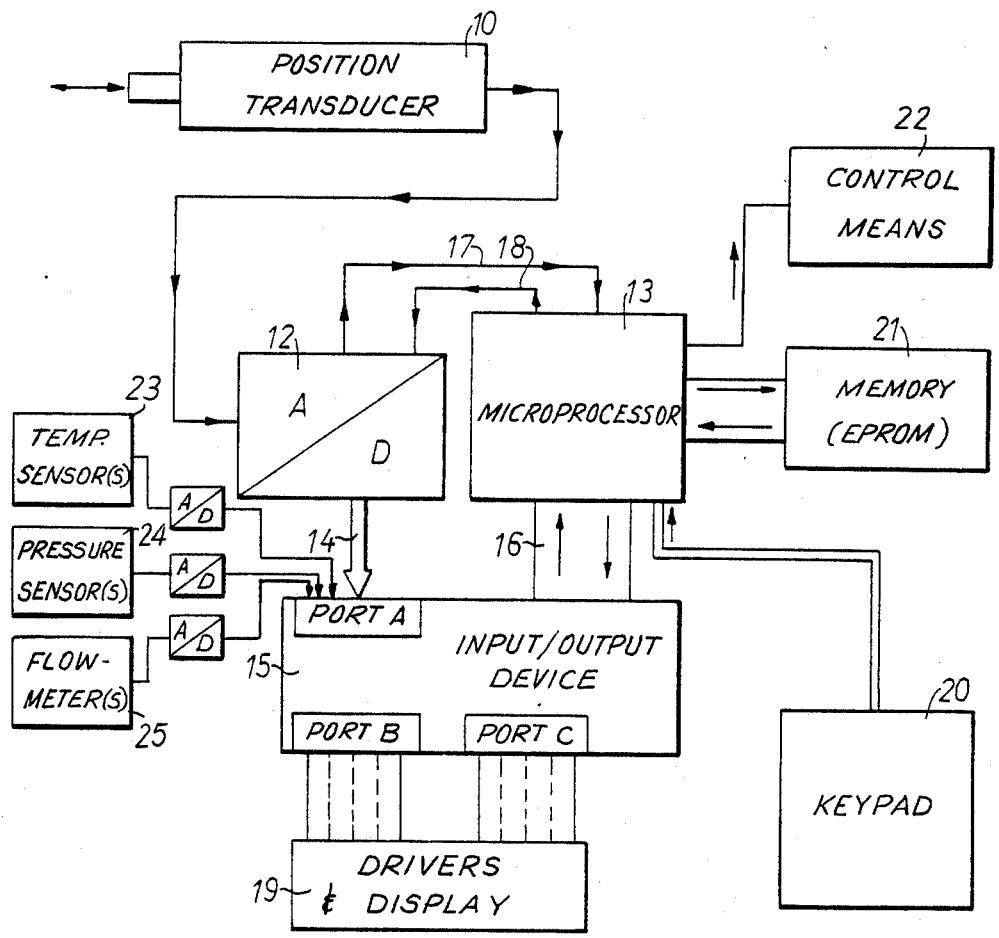
FIG. 4 is a block diagram of the device according to the present invention.

In the device of the present invention, as illustrated in FIG. 4, a position transducer 10, which may be a rotary or a linear position transducer, is connected to a valve so that it is displaced with the valve actuator member, opening and closing the valve, so as to measure the valve stroke and to produce an electrical signal determined by the position of the valve actuator member. A suitable transducer would be an analogue potentiometric division transducer and linear transducers are known having strokes of between 2.5 meters and 250 mm and a suitable transducer would be selected according to the stroke of the valve to be monitored. As an alternative to a linear transducer, for valves utilising a rotary movement of the valve member rather than a linear displacement, a rotary transducer would be utilised, also in the form of a potentiometer the wiper of which is attached to the spindle of the valve member.

Figure 5A:
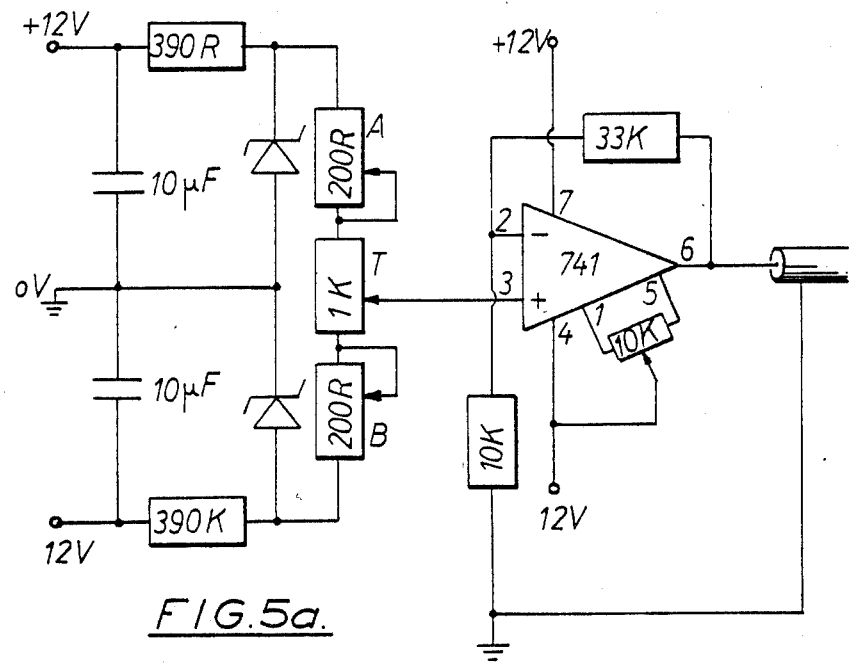
FIGS. 5a and 5b illustrate examples of linear and rotary position transducers.
Figure 5B:
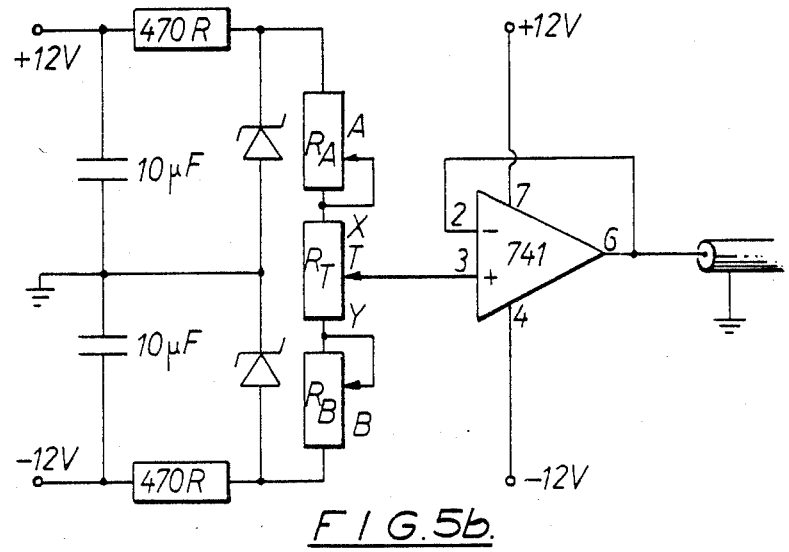

Examples of suitable arrangements of transducers are illustrated in FIGS. 5a and 5b, 5a being a schematic illustration of a rotary type transducer and 5b illustrating a linear transducer. In each case the transducer T is potentiometer the wiper of which is displaceable with the valve actuator member of the valve to which it is connected, and two potentiometers A and B are provided to allow adjustment of the circuit to accommodate different transducers. A temperature stable resistance and Zener diode network is provided to maintain stable potentials at the ends of the transducer, and the output voltage of the transducer T is buffered with a voltage follower to enable processor circuitry to be placed remotely from the valve up to a distance of 200 meters. The output of the voltage follower is supplied as an input to the analog-to-digital converter 12 of FIG. 4. The analog-to-digital converter 12 converts the transducer output voltage to a digital signal for input to a microprocessor 13. The output of the analog-to-digital converter 12 are supplied to the microprocessor 13 via a peripheral random access memory (RAM) and input-output device 15, the output data lines 14 of the analog-to-digital converter 12 being connected to a port A of the input-output device 15 and then provided as an input to the microprocessor 13 via data bus 16. Control of the analog-to-digital converter 12 is performed by the microprocessor 13 by means of control lines 17 and 18.

The peripheral RAM and input-output device 15 has two further ports, port B and port C for driving the display 19 under the control of the microprocessor 13. Input of initial conditions governing the flow rate are provided by means of a key-pad 20 which enables an operator to identify to the processor the particular fluid flowing through a valve being monitored, to specify the type of valve and to input information such as the temperature and pressure of the fluid. Detailed information regarding the flow characteristics of the different types of valves to be monitored, together with information regarding the viscosity/temperature curves and the effect viscosity has on flow rate, such as illustrated in graphic form in FIGS. 1 to 3 are stored as data in the program memory 21 which also contains the controlling program for the microprocessor 13. The program memory 21 is suitably Erasable Programmable Read-Only Memory (EPROM) so that if necessary, the contents of the memory can be erased and a new program incorporated for the characteristics of a different family of valves or fluids.

As an alternative to inputting information regarding the pressure and temperature via the keyboard, appropriate means may be provided for inputting such information directly into the processor system from temperature probes 23 and pressure gauges 24, or even from flowmeters 25 for comparison purposes. Further, the microprocessor can be provided with suitable output control means 22 operating a servo-mechanism for automatically adjusting the valve to regulate the flow rate within prescribed tolerance limits, so as to enable the flow rate to be maintained independently of variations in pressure or temperature. Further, the microprocessor could annunciate an alarm if prescribed tolerance levels could not be maintained, or actuate other systems regulating the temperature and pressure of the fluid in a pipeline.

The use of a microprocessor enables a large number of valves to be monitored simultaneously and an indication to be given of fluid flow through each valve for any number of fluid types including water at a specified temperature, preferably in the range 0° to 250° F., (−18° to 120° C.), and for the particular valve actuator position to be expressed as a percentage of the flow of water at 0° F. (−18° C.) through the same valve when fully open. The arrangement of the present invention may be a single integrated unit monitoring up to 250 valves simultaneously or it may be combined with a mini-computer with a visual display unit (VDU), or a main-frame computer and the output can be provided via the computer if required.

In operation, the microprocessor 13 performs a series of calculations utilising the input data supplied via the keyboard or directly from in-line sensors, together with the information provided by the position transducer of the valve, and data stored in the memory 21 relating to the flow characteristic curves of each valve and the flow characteristics of the fluid flowing through the valve, to provide an output which is an indication of the flow rate through the valve derived directly from the position of the valve member. It is also possible to utilise the same information to ascertain the effect that variations of temperature or pressure will have on the flow through the valve.

Thus, a device has been provided which enables a plurality of valves to be simultaneously monitored and for the flow rate through valves to be ascertained in dependance upon the actual opening of the valve, and whilst the preferred embodiment relates particularly to valves, it should be readily apparent to a person skilled in the art that the device of the present invention is equally applicable with minor modification, relating to the type of transducer used, to pumps, for monitoring the flow therethrough.

I claim:

1. A device for monitoring the flow rate through at least one valve to enable each said valve to be converted effectively into a flow meter, said device comprising a transducer connected to each said valve for providing a first signal representative of the position of the valve member of each said valve, electronic processing means which receives said first signal and having means enabling input of further signals representing static initial conditions and variable operating conditions influencing the flow rate, wherein said electronic processing means includes means enabling storage of data relating to the flow characteristic curves of a plurality of different types of valves, whereby said electronic processing means calculates the flow rate through each said valve from (a) said first signal, (b) the flow characteristics of said valve and (c) said further signals, said device further comprising display means connected to the output of said electronic processing means for displaying said calculated flow rate.

2. A device for monitoring the flow rate through at least one valve to enable each said valve to be converted effectively into a flow meter, said device comprising a transducer connected to each said valve for providing a first signal representative of the position of the valve member of each said valve, a electronic processing means which receives said first signal and having means enabling input of further signals representing static initial conditions and variable operating conditions influencing the flow rate, wherein said electronic processing means includes means enabling storage of data relating to the flow characteristic curves of a plurality of different types of valves, whereby said electronic processing means calculates the flow rate through each said valve from (a) said first signal, (b) the flow characteristics of said valve and (c) said further signals, said device further comprising control means connected to the output of said electronic processing means for adjusting each said valve to regulate the flow rate.

3. A device for monitoring the flow rate through at least one valve to enable each said valve to be converted effectively into a flowmeter, said device comprising a transducer connected to each said valve for providing a first signal representative of the position of the valve member of each said valve, electronic processing means which receives said first signal and having means enabling input of further signals representing static initial conditions and variable operating conditions influencing the flow rate, wherein said electronic processing means includes means enabling storage of data relating to the flow characteristic curves of a plurality of different types of valves, whereby said electronic processing means calculates the flow rate through each said valve from (a) said first signal, (b) the flow characteristics of said valve and (c) said further signals, said device further comprising display means connected to the output of said electronic processing means for displaying said calculated flow rate and control means connected to the output of said electronic processing means for adjusting each said valve to regulate the flow rate.

4. A device as claimed in claim 2 or 3, in which said control means activates a servo-mechanism connected to said valve to regulate the flow rate through said valve in accordance with programmed instructions and prevailing operating conditions.

5. A device as claimed in claim 1, 2 or 3, in which the electronic processing means monitors and controls up to 250 valves simultaneously in accordance with prescribed conditions.

6. A device as claimed in claim 1, 2 or 3, wherein the electronic processing means actuates an alarm if the flow rate ascertained falls outside a predetermined range of acceptable flow rate.

7. A device as claimed in claim 1, 2 or 3, wherein the electronic processing means predicts the effect of variations in temperature, pressure and valve opening on the flow rate.

8. A device as claimed in claim 1, 2 or 3, in which the transducer is connected to the electronic processing means via an analog-to-digital converter for converting the output of the transducer into digital form for input into the electronic processing means.

9. A device as claimed in claim 1, 2 or 3, wherein said electronic processing means is a microprocessor having storage means associated therewith containing data relating to the flow characteristics of a plurality of different types of valves and data regarding the effect of viscosity variations on flow rate and data relating to the variations in viscosity with temperature for a plurality of different fluids.

10. A device as claimed in claim 9, in which the transducer is connected to the electronic processing means via an analog-to-digital converter for converting the output of the transducer into digital form for input into the electronic processing means.

11. A device as claimed in claim 9, further comprising a key-board for enabling input of the static initial conditions to the microprocessor.

12. A device as claimed in claim 9, in which the variable operating conditions are supplied to the microprocessor from temperature and pressure sensors, and wherein calibration data is supplied to the microprocessor from flow meters.

* * * * *